United States Patent
White et al.

(10) Patent No.: US 10,631,558 B2
(45) Date of Patent: Apr. 28, 2020

(54) METHODS AND APPARATUSES FOR MAKING COMPOSITIONS COMPRISING AN ACID AND AN ACID DEGRADABLE COMPONENT AND/OR COMPOSITIONS COMPRISING A PLURALITY OF SELECTABLE COMPONENTS

(75) Inventors: Newton White, Decatur, GA (US); Kelly H. Sepcic, Mableton, GA (US); Gregg Carpenter, Marietta, GA (US); Lawrence B. Ziesel, Woodstock, GA (US); Robert D. Hughes, IV, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 2366 days.

(21) Appl. No.: 11/276,553

(22) Filed: Mar. 6, 2006

(65) Prior Publication Data

US 2007/0212468 A1   Sep. 13, 2007

(51) Int. Cl.
 *A23L 2/52* (2006.01)
 *B67D 1/00* (2006.01)

(52) U.S. Cl.
 CPC .............. *A23L 2/52* (2013.01); *B67D 1/0021* (2013.01); *B67D 1/0037* (2013.01); *A23V 2002/00* (2013.01)

(58) Field of Classification Search
 CPC ... B67D 1/0021; B67D 1/0022; B67D 1/0034
 (Continued)

(56) References Cited

U.S. PATENT DOCUMENTS 1,735,118 A * 11/1929 Ludwig .................... A23L 1/068
                                                              426/489
2,880,912 A *  4/1959 Fisher ......................... 222/129.4
(Continued)

FOREIGN PATENT DOCUMENTS

| AT | 319795 B | 1/1975 |
| AU | 8782624 A | 12/1990 |

(Continued)

OTHER PUBLICATIONS http://www.drinksmixer.com (2005).*
(Continued)

*Primary Examiner* — Walter A Moore
(74) *Attorney, Agent, or Firm* — Eversheds Sutherland (US) LLP

(57) ABSTRACT

A method and apparatus for making a composition comprising storing at least one acid in an acid storage container, storing at least one acid-degradable component in a component storage container, and mixing the at least one acid from the acid storage container and the at least one acid-degradable component from the component storage container such that the at least one acid and the at least one acid-degradable component mix together to form the composition. A method and apparatus for providing a selected beverage from a plurality of selectable beverages comprising storing a number of non-sweetener beverage component concentrates separately in a respective number of beverage component storage containers and in response the selection of the selected beverage, automatically dispensing, continuously in a predetermined ratio for any volume of the beverage dispensed, any combination of at least two or more of the number of non-sweetener beverage component concentrates and a diluent.

21 Claims, 3 Drawing Sheets

(58) Field of Classification Search
USPC ...... 426/590; 222/1, 132, 129, 129.1, 129.2, 222/129.3, 129.4; 141/104
See application file for complete search history.

(56) References Cited

U.S. PATENT DOCUMENTS

| | | | |
|---|---|---|---|
| 3,305,368 A * | 2/1967 | Bourelle | 426/120 |
| 3,664,550 A | 5/1972 | Carothers et al. | |
| 3,822,056 A | 7/1974 | Hawes, Jr. et al. | |
| 3,827,467 A * | 8/1974 | Henley et al. | 141/104 |
| 3,934,759 A | 1/1976 | Giannella et al. | |
| 4,008,832 A | 2/1977 | Rodth | |
| 4,211,342 A | 7/1980 | Jamgochian et al. | |
| 4,218,014 A | 8/1980 | Tracy | |
| 4,392,588 A | 7/1983 | Scalera | |
| 4,487,333 A | 12/1984 | Pounder et al. | |
| 4,619,378 A | 10/1986 | de Man | |
| 4,632,275 A * | 12/1986 | Parks | B67D 1/0021 222/129.1 |
| 4,695,468 A * | 9/1987 | Boston | 426/8 |
| 4,753,370 A | 6/1988 | Rudick | |
| 4,779,761 A | 10/1988 | Rudick et al. | |
| 4,784,495 A | 11/1988 | Jonsson et al. | |
| 4,793,518 A | 12/1988 | Burton | |
| 4,793,520 A | 12/1988 | Gerber | |
| 4,797,293 A | 1/1989 | Evans et al. | |
| 4,815,633 A | 3/1989 | Kondo et al. | |
| 4,821,925 A | 4/1989 | Wiley et al. | |
| 4,827,426 A | 5/1989 | Patton et al. | |
| 4,830,511 A | 5/1989 | Smazik | |
| 4,830,870 A * | 5/1989 | Davis et al. | 426/599 |
| 4,860,923 A | 8/1989 | Kirschner et al. | |
| 4,881,663 A | 11/1989 | Seymour | |
| 4,889,148 A | 12/1989 | Smazik | |
| 4,923,092 A | 5/1990 | Kirschner et al. | |
| 4,923,093 A | 5/1990 | Gerber | |
| 4,932,564 A | 6/1990 | Austin et al. | |
| 4,934,567 A | 6/1990 | Vahjen et al. | |
| 4,955,507 A | 9/1990 | Kirschner et al. | |
| 5,000,357 A | 3/1991 | Shannon et al. | |
| 5,027,284 A | 6/1991 | Senghaas et al. | |
| 5,033,648 A | 7/1991 | Nakayama et al. | |
| 5,033,651 A | 7/1991 | Whigham et al. | |
| 5,056,686 A | 10/1991 | Jarrett | |
| 5,082,143 A | 1/1992 | Schramm, Jr. | |
| 5,087,469 A | 2/1992 | Acree | |
| 5,116,632 A | 5/1992 | Miller | |
| RE33,969 E | 6/1992 | Richter | |
| 5,139,708 A | 8/1992 | Scott | |
| 5,154,586 A | 10/1992 | Rudick | |
| 5,192,003 A | 3/1993 | Billings | |
| 5,207,148 A | 5/1993 | Anderson et al. | |
| 5,265,520 A | 11/1993 | Giuliano | |
| 5,292,030 A | 3/1994 | Kateman et al. | |
| 5,303,846 A | 4/1994 | Shannon | |
| 5,316,779 A | 5/1994 | Morey | |
| 5,341,957 A | 8/1994 | Sizemore | |
| 5,350,587 A | 9/1994 | Plester | |
| 5,353,963 A * | 10/1994 | Gorski | B67D 1/0021 222/129.1 |
| 5,433,967 A | 7/1995 | Kateman et al. | |
| 5,457,626 A | 10/1995 | Wolze | |
| 5,465,870 A | 11/1995 | Sizemore | |
| 5,473,909 A | 12/1995 | Kateman et al. | |
| 5,507,415 A | 4/1996 | Sizemore | |
| 5,522,660 A | 6/1996 | O'Dougherty et al. | |
| 5,526,959 A | 6/1996 | Green | |
| 5,575,405 A | 11/1996 | Stratton et al. | |
| 5,588,557 A | 12/1996 | Topar | |
| 5,603,257 A | 2/1997 | Kateman et al. | |
| 5,615,801 A | 4/1997 | Schroeder et al. | |
| 5,650,186 A | 7/1997 | Annoni et al. | |
| 5,653,157 A | 8/1997 | Miller | |
| 5,673,820 A | 10/1997 | Green et al. | |
| 5,725,125 A | 3/1998 | Bessette et al. | |
| 5,727,713 A | 3/1998 | Kateman et al. | |
| 5,731,981 A | 3/1998 | Simard | |
| 5,740,946 A | 4/1998 | Swier et al. | |
| 5,753,294 A | 5/1998 | Savello | |
| 5,758,571 A | 6/1998 | Kateman et al. | |
| 5,778,761 A | 7/1998 | Miller | |
| 5,797,436 A | 8/1998 | Phallen et al. | |
| 5,803,320 A | 9/1998 | Cutting et al. | |
| 5,842,603 A | 12/1998 | Schroeder et al. | |
| 5,868,065 A | 2/1999 | Haggerty et al. | |
| 5,868,279 A | 2/1999 | Powell | |
| 5,878,964 A | 3/1999 | Hansen | |
| 5,890,626 A | 4/1999 | Wolski et al. | |
| 5,925,392 A | 7/1999 | Sponholtz | |
| 5,955,132 A | 9/1999 | Spica et al. | |
| 5,960,997 A | 10/1999 | Forsythe | |
| 5,967,367 A | 10/1999 | Orsborn | |
| 5,975,365 A | 11/1999 | Hsieh | |
| 5,980,969 A | 11/1999 | Mordini et al. | |
| 5,996,650 A | 12/1999 | Phallen et al. | |
| 5,997,236 A | 12/1999 | Picioccio et al. | |
| 6,045,007 A | 4/2000 | Simmons | |
| 6,047,859 A | 4/2000 | Schroeder et al. | |
| 6,098,524 A | 8/2000 | Reese | |
| 6,116,460 A | 9/2000 | Kim et al. | |
| 6,126,983 A | 10/2000 | Miller | |
| 6,135,319 A | 10/2000 | Camezon | |
| 6,149,035 A | 11/2000 | Gorski et al. | |
| 6,170,707 B1 | 1/2001 | Wolski et al. | |
| 6,173,862 B1 | 1/2001 | Buca et al. | |
| 6,182,555 B1 | 2/2001 | Scheer et al. | |
| 6,186,193 B1 | 2/2001 | Phallen et al. | |
| 6,223,948 B1 | 5/2001 | Davis | |
| 6,240,829 B1 | 6/2001 | McGarrah | |
| 6,254,963 B1 | 7/2001 | Tachibana | |
| 6,286,721 B1 | 9/2001 | Pellegrini | |
| 6,298,769 B1 | 10/2001 | Stettes et al. | |
| 6,319,537 B1 | 11/2001 | Cheng et al. | |
| 6,321,938 B1 | 11/2001 | Edwards et al. | |
| 6,345,729 B1 | 2/2002 | Santy, Jr. | |
| 6,350,484 B1 | 2/2002 | Ault | |
| 6,364,159 B1 | 4/2002 | Newman et al. | |
| 6,374,845 B1 | 4/2002 | Melendez et al. | |
| 6,375,042 B1 | 4/2002 | Goodwin | |
| 6,375,043 B1 | 4/2002 | LeBlanc | |
| 6,394,312 B1 | 5/2002 | Endou | |
| 6,419,120 B1 | 7/2002 | Bertone | |
| 6,421,583 B1 | 7/2002 | Sudolcan et al. | |
| 6,422,422 B1 | 7/2002 | Forbes | |
| 6,435,375 B2 | 8/2002 | Durham et al. | |
| 6,446,834 B2 | 9/2002 | Davis et al. | |
| 6,450,369 B1 | 9/2002 | Heyes | |
| 6,464,464 B2 | 10/2002 | Sabini et al. | |
| 6,478,192 B2 | 11/2002 | Heyes | |
| 6,496,752 B2 | 12/2002 | Sudolcan et al. | |
| 6,536,626 B2 | 3/2003 | Newman et al. | |
| 6,547,100 B2 | 4/2003 | Phillips et al. | |
| 6,550,641 B2 | 4/2003 | Newman et al. | |
| 6,550,642 B2 | 4/2003 | Newman et al. | |
| 6,588,725 B1 | 7/2003 | Wisnieski et al. | |
| 6,600,968 B2 | 7/2003 | Sudolcan et al. | |
| 6,600,969 B2 | 7/2003 | Sudolcan et al. | |
| 6,607,013 B1 | 8/2003 | Leoni | |
| 6,650,962 B2 | 11/2003 | Sudolcan et al. | |
| 6,669,053 B1 | 12/2003 | Garson et al. | |
| 6,685,054 B2 | 2/2004 | Kameyama | |
| 6,689,410 B2 | 2/2004 | Gerber | |
| 6,694,748 B2 | 2/2004 | Sergio et al. | |
| 6,698,228 B2 | 3/2004 | Kateman et al. | |
| 6,698,621 B2 | 3/2004 | Landers et al. | |
| 6,745,595 B1 | 6/2004 | Kateman et al. | |
| 6,751,525 B1 | 6/2004 | Crisp, III | |
| 6,756,069 B2 | 6/2004 | Scoville et al. | |
| 6,758,571 B2 | 7/2004 | Heaton | |
| 6,759,072 B1 | 7/2004 | Gutwein et al. | |
| 6,763,860 B2 | 7/2004 | Jungmann et al. | |
| 6,766,656 B1 | 7/2004 | Crisp, III et al. | |
| 6,726,062 B2 | 11/2004 | Segiet | |
| 6,896,159 B2 | 5/2005 | Crisp, III et al. | |

(56) References Cited

U.S. PATENT DOCUMENTS

| | | |
|---|---|---|
| 6,907,741 B2 | 6/2005 | Kateman |
| 6,915,732 B2 | 7/2005 | Jones et al. |
| 6,915,926 B2 | 7/2005 | Naik |
| 6,934,602 B2 | 8/2005 | Sudolcan et al. |
| 6,935,532 B2 | 8/2005 | Tinucci et al. |
| 6,941,858 B2 | 9/2005 | Kateman |
| 6,945,157 B2 | 9/2005 | Brown et al. |
| 6,952,928 B2 | 10/2005 | Kateman et al. |
| 6,957,125 B1 | 10/2005 | Rifkin |
| 6,983,863 B2 | 1/2006 | Santy, Jr. |
| 6,988,641 B2 | 1/2006 | Jones et al. |
| 6,994,231 B2 | 2/2006 | Jones |
| 7,013,933 B2 | 3/2006 | Sher et al. |
| 7,021,197 B2 | 4/2006 | Chen et al. |
| 7,032,818 B2 | 4/2006 | Thomas et al. |
| 7,036,686 B2 | 5/2006 | Newton |
| 7,059,761 B2 | 6/2006 | Gerber |
| 7,077,290 B2 | 7/2006 | Bethuy et al. |
| 7,108,156 B2 | 9/2006 | Fox |
| 7,147,131 B2 | 12/2006 | Sher et al. |
| 7,156,259 B2 | 1/2007 | Bethuy et al. |
| 7,159,743 B2 | 1/2007 | Brandt et al. |
| 7,162,391 B2 | 1/2007 | Knepier et al. |
| 7,203,572 B2 | 4/2007 | Crisp, III |
| 7,223,426 B2 | 5/2007 | Cheng et al. |
| 7,231,279 B2 | 6/2007 | Ghidotti |
| 7,243,818 B2 | 7/2007 | Jones |
| 7,290,680 B2 | 11/2007 | Henry et al. |
| 7,311,225 B2 | 12/2007 | Newton |
| 7,311,226 B2 | 12/2007 | Kado et al. |
| 7,320,416 B2 | 1/2008 | Miller et al. |
| 7,325,485 B2 | 2/2008 | Carhuff et al. |
| 7,328,815 B2 | 2/2008 | Lowe |
| 7,331,483 B2 | 2/2008 | Bhimani et al. |
| 7,337,920 B2 | 3/2008 | Duck et al. |
| 7,347,334 B2 | 3/2008 | Engels et al. |
| 7,347,344 B2 | 3/2008 | Engels et al. |
| 7,353,080 B2 | 4/2008 | Walker et al. |
| 7,367,475 B2 | 5/2008 | Horth et al. |
| 7,380,494 B2 | 6/2008 | Tobin et al. |
| 7,383,969 B2 | 6/2008 | Horth et al. |
| 7,640,755 B1 | 1/2010 | Kateman |
| 2001/0017815 A1 | 8/2001 | Ackermann et al. |
| 2001/0041139 A1 | 11/2001 | Sabini et al. |
| 2002/0129712 A1 | 9/2002 | Westbrook et al. |
| 2003/0012081 A1 | 1/2003 | Jungmann et al. |
| 2003/0012864 A1 | 1/2003 | Gerber |
| 2003/0091443 A1 | 5/2003 | Sabini et al. |
| 2003/0097314 A1 | 5/2003 | Crisp, III et al. |
| 2003/0227820 A1 | 12/2003 | Parrent |
| 2004/0026447 A1 | 2/2004 | Badin et al. |
| 2004/0026452 A1 | 2/2004 | Santiago et al. |
| 2004/0040983 A1 | 3/2004 | Ziesel |
| 2004/0056046 A1 | 3/2004 | Jones et al. |
| 2004/0071841 A1 | 4/2004 | Carhuff et al. |
| 2004/0103033 A1 | 5/2004 | Reade et al. |
| 2004/0129720 A1 | 7/2004 | Cheng et al. |
| 2004/0170727 A1 | 9/2004 | Howard et al. |
| 2004/0194629 A1 | 10/2004 | Jones et al. |
| 2004/0217129 A1 | 11/2004 | Roekens et al. |
| 2005/0029287 A1 | 2/2005 | Mobbs |
| 2005/0061837 A1 | 3/2005 | Sudolcan et al. |
| 2005/0082313 A1* | 4/2005 | Fox .................. B67D 1/0021 222/129.1 |
| 2005/0103799 A1 | 5/2005 | Litterst et al. |
| 2005/0115989 A1 | 6/2005 | Ludovissie |
| 2005/0121466 A1 | 6/2005 | Sher et al. |
| 2005/0166761 A1 | 8/2005 | Jones et al. |
| 2005/0166766 A1 | 8/2005 | Jones |
| 2005/0175767 A1 | 8/2005 | Gerber |
| 2005/0178793 A1 | 8/2005 | Cheng et al. |
| 2005/0201196 A1 | 9/2005 | Gerber |
| 2005/0211768 A1 | 9/2005 | Stillman |
| 2005/0258186 A1 | 11/2005 | Hart et al. |
| 2005/0269360 A1 | 12/2005 | Piatnik et al. |
| 2005/0284885 A1 | 12/2005 | Kadyk et al. |
| 2006/0036454 A1 | 2/2006 | Henderson |
| 2006/0045942 A1 | 3/2006 | Sher et al. |
| 2006/0054614 A1 | 3/2006 | Baxter et al. |
| 2006/0081653 A1 | 4/2006 | Boland et al. |
| 2006/0097009 A1 | 5/2006 | Bethuy et al. |
| 2006/0108415 A1 | 5/2006 | Thomas et al. |
| 2006/0113323 A1 | 6/2006 | Jones |
| 2006/0115570 A1 | 6/2006 | Guerrero et al. |
| 2006/0115572 A1 | 6/2006 | Guerrero et al. |
| 2006/0157504 A1 | 7/2006 | Barker et al. |
| 2006/0172056 A1 | 8/2006 | Tobin et al. |
| 2006/0191964 A1 | 8/2006 | Ziesel |
| 2006/0196886 A1 | 9/2006 | Fox |
| 2006/0249536 A1 | 11/2006 | Hartman et al. |
| 2006/0278090 A1 | 12/2006 | Spisak |
| 2006/0283884 A1 | 12/2006 | Saggin et al. |
| 2007/0009365 A1 | 1/2007 | Litterst et al. |
| 2007/0080169 A1 | 4/2007 | Sher et al. |
| 2007/0114243 A1 | 5/2007 | Kershaw et al. |
| 2007/0114244 A1 | 5/2007 | Gatipon et al. |
| 2007/0251260 A1 | 11/2007 | Baxter et al. |
| 2007/0255450 A1 | 11/2007 | Mazur et al. |
| 2007/0257059 A1 | 11/2007 | Stevenson |
| 2007/0272317 A1 | 11/2007 | Klopfenstein et al. |
| 2008/0023488 A1 | 1/2008 | Guerrero et al. |
| 2008/0029541 A1 | 2/2008 | Wallace et al. |
| 2008/0029542 A1 | 2/2008 | Keller |
| 2008/0041876 A1 | 2/2008 | Frank et al. |
| 2008/0083780 A1 | 4/2008 | Romanyszyn et al. |
| 2008/0083782 A1 | 4/2008 | Heusser et al. |
| 2008/0093382 A1 | 4/2008 | Sher et al. |
| 2008/0099506 A1 | 5/2008 | Jamison et al. |
| 2008/0110930 A1 | 5/2008 | Wittkamp et al. |
| 2008/0115672 A1 | 5/2008 | Jones et al. |
| 2008/0121655 A1 | 5/2008 | Schultz et al. |
| 2008/0142548 A1 | 6/2008 | Moen et al. |
| 2008/0149126 A1 | 6/2008 | Abergel |
| 2008/0149666 A1 | 6/2008 | LaFlamme et al. |
| 2008/0149669 A1 | 6/2008 | Nicholson et al. |
| 2008/0283550 A1 | 11/2008 | Nighy et al. |
| 2008/0302818 A1 | 12/2008 | Minard et al. |
| 2010/0049370 A1* | 2/2010 | Raber ................ A23G 9/28 700/285 |

FOREIGN PATENT DOCUMENTS

| | | |
|---|---|---|
| AU | 8943614 A | 10/1992 |
| AU | 9182541 A | 7/1993 |
| AU | 9180850 A | 3/1994 |
| AU | 9456371 A | 9/1994 |
| AU | 9516757 B | 7/1997 |
| AU | 9719013 B | 10/1997 |
| AU | 2002362597 B2 | 12/1997 |
| AU | 9645173 B | 1/1998 |
| AU | 734299 B2 | 6/1998 |
| AU | 745372 B2 | 7/1999 |
| AU | 199921393 A1 | 10/1999 |
| AU | 744022 B2 | 2/2000 |
| AU | 199891349 A1 | 5/2000 |
| AU | 745539 B2 | 6/2000 |
| AU | 756406 B2 | 8/2000 |
| AU | 9892355 A | 8/2000 |
| AU | 756091 B2 | 2/2001 |
| AU | 760653 B2 | 6/2001 |
| AU | 2001251732 B2 | 10/2001 |
| AU | 2001100273 B4 | 11/2001 |
| AU | 2001274664 B2 | 12/2001 |
| AU | 2001281056 B2 | 2/2002 |
| AU | 2002234639 13 | 9/2002 |
| AU | 200238172 A1 | 11/2002 |
| AU | 2002256450 B2 | 11/2002 |
| AU | 2002308704 B2 | 11/2002 |
| AU | 2001270993 B2 | 1/2003 |
| AU | 2002353654 B2 | 6/2003 |
| AU | 2002300732 A1 | 11/2003 |
| AU | 768650 B2 | 12/2003 |
| AU | 2004280313 A2 | 4/2005 |
| AU | 2005239709 A1 | 12/2005 |

(56) References Cited

FOREIGN PATENT DOCUMENTS

| | | |
|---|---|---|
| AU | 2006201657 A1 | 5/2006 |
| AU | 2005202597 A1 | 8/2006 |
| AU | 2005225146 B1 | 8/2006 |
| AU | 2007202881 A1 | 7/2007 |
| AU | 2001282509 B2 | 9/2007 |
| AU | 2002340677 B2 | 9/2007 |
| AU | 2002257124 B2 | 10/2007 |
| BE | 1005369 A6 | 7/1993 |
| CA | 1242676 | 2/1988 |
| CA | 2036622 | 8/1991 |
| CA | 1290150 | 10/1991 |
| CA | 2088976 | 2/1992 |
| CA | 1300904 | 5/1992 |
| CA | 1305104 | 7/1992 |
| CA | 1336200 | 7/1995 |
| CA | 2143512 | 8/1995 |
| CA | 2205260 | 6/1996 |
| CA | 2213081 | 8/1996 |
| CA | 2215413 | 10/1996 |
| CA | 2233275 | 4/1997 |
| CA | 2195929 | 9/1997 |
| CA | 2265623 | 2/1998 |
| CA | 2243960 | 6/1998 |
| CA | 2276189 | 7/1998 |
| CA | 2211051 | 8/1998 |
| CA | 2291152 | 12/1998 |
| CA | 2135904 | 4/1999 |
| CA | 2229832 | 8/1999 |
| CA | 2336367 | 1/2000 |
| CA | 2339361 | 2/2000 |
| CA | 2339750 | 2/2000 |
| CA | 2378126 | 2/2001 |
| CA | 2378288 | 2/2001 |
| CA | 2380439 | 2/2001 |
| CA | 2568231 | 2/2001 |
| CA | 2568233 | 2/2001 |
| CA | 2568237 | 2/2001 |
| CA | 2568239 | 2/2001 |
| CA | 2568246 | 2/2001 |
| CA | 2313794 | 1/2002 |
| CA | 2422277 | 3/2002 |
| CA | 2429523 | 5/2002 |
| CA | 2432679 | 6/2002 |
| CA | 2434818 | 8/2002 |
| CA | 2441144 | 9/2002 |
| CA | 2127808 | 11/2002 |
| CA | 2386433 | 11/2002 |
| CA | 2447082 | 1/2003 |
| CA | 2453324 | 1/2003 |
| CA | 2422545 | 3/2003 |
| CA | 2473961 | 3/2003 |
| CA | 2461307 | 4/2003 |
| CA | 2466752 | 5/2003 |
| CA | 2466961 | 5/2003 |
| CA | 2419356 | 8/2003 |
| CA | 2479243 | 9/2003 |
| CA | 2482542 | 11/2003 |
| CA | 2484170 | 11/2003 |
| CA | 2486349 | 11/2003 |
| CA | 2495317 | 2/2004 |
| CA | 2501747 | 4/2004 |
| CA | 2513719 | 8/2004 |
| CA | 2513891 | 8/2004 |
| CA | 2515188 | 8/2004 |
| CA | 2444027 | 11/2004 |
| CA | 2521098 | 11/2004 |
| CA | 2522843 | 11/2004 |
| CA | 2524049 | 11/2004 |
| CA | 2476338 | 1/2005 |
| CA | 2530383 | 1/2005 |
| CA | 2533058 | 2/2005 |
| CA | 2486041 | 4/2005 |
| CA | 2544144 | 5/2005 |
| CA | 2544274 | 5/2005 |
| CA | 2576374 | 7/2005 |
| CA | 2554502 | 8/2005 |
| CA | 2557674 | 9/2005 |
| CA | 2558876 | 9/2005 |
| CA | 2565821 | 11/2005 |
| CA | 2566240 | 11/2005 |
| CA | 2566463 | 12/2005 |
| CA | 2570288 | 1/2006 |
| CA | 2574860 | 1/2006 |
| CA | 2572230 | 2/2006 |
| CA | 2518803 | 3/2006 |
| CA | 2577849 | 3/2006 |
| CA | 2584150 | 4/2006 |
| CA | 2587098 | 5/2006 |
| CA | 2588282 | 6/2006 |
| CA | 2588393 | 6/2006 |
| CA | 2591788 | 6/2006 |
| CA | 2592052 | 6/2006 |
| CA | 2594854 | 7/2006 |
| CA | 2596016 | 8/2006 |
| CA | 2596020 | 8/2006 |
| CA | 2545868 | 11/2006 |
| CA | 2598590 | 11/2006 |
| CA | 2527520 | 5/2007 |
| CA | 2537775 | 8/2007 |
| CA | 2580317 | 9/2007 |
| DE | 381482 | 9/1923 |
| DE | 3709155 A1 | 10/1987 |
| EP | 0083467 A1 | 7/1983 |
| EP | 0104447 A2 | 4/1984 |
| EP | 0105017 B1 | 4/1984 |
| EP | 0112638 A2 | 7/1984 |
| EP | 0136005 A1 | 4/1985 |
| EP | 0154681 A1 | 9/1985 |
| EP | 0158096 A2 | 10/1985 |
| EP | 0175815 A2 | 4/1986 |
| EP | 307150 A1 | 3/1989 |
| EP | 0643 667 B1 | 4/1996 |
| EP | 727165 A1 | 8/1996 |
| EP | 0729741 A1 | 9/1996 |
| EP | 0810370 A | 12/1997 |
| EP | 0786948 B1 | 2/1999 |
| EP | 1038829 A | 9/2000 |
| EP | 0958234 B1 | 11/2001 |
| EP | 1356866 A | 10/2003 |
| EP | 1380536 A1 | 1/2004 |
| EP | 1453 018 A1 | 9/2004 |
| EP | 1453018 A1 | 9/2004 |
| EP | 1460029 A | 9/2004 |
| EP | 1538124 A1 | 8/2005 |
| EP | 0672616 A2 | 9/2005 |
| EP | 1829818 A2 | 9/2007 |
| EP | 1905730 | 4/2008 |
| FR | 2624844 A | 6/1989 |
| GB | 2303354 A | 2/1997 |
| GB | 2416757 A | 2/2006 |
| GB | 2429694 A | 3/2007 |
| GB | 2429694 B | 7/2007 |
| GB | 2442223 | 4/2008 |
| JP | 09134481 A | 5/1997 |
| JP | 2006014745 A2 | 1/2006 |
| WO | 8809766 A1 | 12/1988 |
| WO | WO 93025466 A2 | 12/1993 |
| WO | WO 9522505 A1 | 8/1995 |
| WO | WO 9606036 A1 | 2/1996 |
| WO | WO 9612644 A1 | 5/1996 |
| WO | WO 9325465 A1 | 2/1997 |
| WO | WO 97047555 A1 | 12/1997 |
| WO | 98006660 A1 | 2/1998 |
| WO | WO 9850165 A1 | 11/1998 |
| WO | WO 99002449 A1 | 1/1999 |
| WO | WO 99007634 A1 | 2/1999 |
| WO | WO 0009437 A2 | 2/2000 |
| WO | WO 00015049 A1 | 3/2000 |
| WO | WO 0017090 A1 | 3/2000 |
| WO | WO 0018499 A1 | 4/2000 |
| WO | WO 00/29103 A | 5/2000 |
| WO | WO 0038825 A1 | 7/2000 |
| WO | PCT/US00/02116 | * 10/2000 ............... B67D 1/00 |
| WO | WO 0065316 A1 | 11/2000 |

(56) References Cited

FOREIGN PATENT DOCUMENTS

| | | |
|---|---|---|
| WO | WO 00065316 A1 | 11/2000 |
| WO | WO 00069274 A1 | 11/2000 |
| WO | WO 0122836 A1 | 4/2001 |
| WO | WO 0134470 A1 | 5/2001 |
| WO | WO 0154551 A1 | 8/2001 |
| WO | WO 0156918 A1 | 8/2001 |
| WO | WO 00010909 A1 | 10/2001 |
| WO | WO 01/91601 A | 12/2001 |
| WO | WO 02057178 A1 | 7/2002 |
| WO | 02059035 A2 | 8/2002 |
| WO | WO 02066835 A1 | 8/2002 |
| WO | WO 2002059035 A2 | 8/2002 |
| WO | WO 02078498 A1 | 10/2002 |
| WO | WO 02087350 A1 | 11/2002 |
| WO | WO 03002449 A1 | 1/2003 |
| WO | WO 03016198 A1 | 2/2003 |
| WO | WO 03/041513 A2 | 5/2003 |
| WO | WO 03068665 A1 | 9/2003 |
| WO | WO 03084860 A1 | 10/2003 |
| WO | WO 03091152 A2 | 11/2003 |
| WO | WO 03097497 A1 | 11/2003 |
| WO | 03107110 A1 | 12/2003 |
| WO | WO 0063107 A | 12/2003 |
| WO | WO 03099704 A1 | 12/2003 |
| WO | WO 2004011361 A1 | 2/2004 |
| WO | WO 04019707 A2 | 3/2004 |
| WO | 2004036515 A1 | 4/2004 |
| WO | WO 2004050537 A2 | 6/2004 |
| WO | WO 2004050541 A2 | 6/2004 |
| WO | WO 2004051163 A2 | 6/2004 |
| WO | WO 2004083789 A1 | 10/2004 |
| WO | WO 2004084688 A1 | 10/2004 |
| WO | WO 2004094585 A2 | 11/2004 |
| WO | WO 2004100756 A3 | 11/2004 |
| WO | WO 2004101122 A3 | 11/2004 |
| WO | WO 2004101424 A1 | 11/2004 |
| WO | WO 04107938 A2 | 12/2004 |
| WO | WO 2005007559 A3 | 1/2005 |
| WO | WO 2005007560 A3 | 1/2005 |
| WO | WO 2005012157 A1 | 2/2005 |
| WO | 2005018788 A1 | 3/2005 |
| WO | WO 2005021417 A3 | 3/2005 |
| WO | WO 05047171 A1 | 5/2005 |
| WO | WO 2005047172 A1 | 5/2005 |
| WO | WO 2005068349 A1 | 7/2005 |
| WO | WO 05070816 A1 | 8/2005 |
| WO | WO 05071267 A1 | 8/2005 |
| WO | WO 2005069919 A2 | 8/2005 |
| WO | WO 2005077811 A3 | 8/2005 |
| WO | WO 2005079329 A3 | 9/2005 |
| WO | WO 2005079361 A2 | 9/2005 |
| WO | WO 2005085121 A1 | 9/2005 |
| WO | WO 2005089922 A3 | 9/2005 |
| WO | WO 05099469 A2 | 10/2005 |
| WO | WO 2005094642 A1 | 10/2005 |
| WO | WO 2005095229 A1 | 10/2005 |
| WO | WO 2005097665 A1 | 10/2005 |
| WO | 2005111955 A1 | 11/2005 |
| WO | WO 2005111955 A1 | 11/2005 |
| WO | WO 05113411 A2 | 12/2005 |
| WO | WO 2005113416 A1 | 12/2005 |
| WO | WO 06001277 A1 | 1/2006 |
| WO | WO 06005923 A1 | 1/2006 |
| WO | WO 2006005401 | 1/2006 |
| WO | WO 2006/019523 A | 2/2006 |
| WO | WO 06013362 A1 | 2/2006 |
| WO | WO 2006016182 A3 | 2/2006 |
| WO | WO 06023310 A2 | 3/2006 |
| WO | WO 2006021039 A1 | 3/2006 |
| WO | WO 2006024409 A3 | 3/2006 |
| WO | WO 06036353 A1 | 4/2006 |
| WO | WO 2006043808 A3 | 4/2006 |
| WO | WO 06066338 A1 | 6/2006 |
| WO | WO 2006058692 A1 | 6/2006 |
| WO | WO 2006076733 A2 | 7/2006 |
| WO | WO 2006078370 A1 | 7/2006 |
| WO | WO 2006082211 A3 | 8/2006 |
| WO | WO 2006088990 A2 | 8/2006 |
| WO | WO 06123131 A1 | 11/2006 |
| WO | WO 06131431 A1 | 12/2006 |
| WO | WO 2006128695 A3 | 12/2006 |
| WO | WO 2006131940 A1 | 12/2006 |
| WO | WO 2007000028 A1 | 1/2007 |
| WO | WO 2007001578 A1 | 1/2007 |
| WO | WO 2007001580 A1 | 1/2007 |
| WO | WO 2007002575 A1 | 1/2007 |
| WO | WO 2007011830 A2 | 1/2007 |
| WO | WO 2007/056407 A | 5/2007 |
| WO | WO 2007/070032 | 6/2007 |
| WO | WO 2006058713 A1 | 9/2007 |
| WO | WO 2007/127525 A | 11/2007 |
| WO | WO 2008015097 A2 | 2/2008 |
| WO | WO 2008022300 A1 | 2/2008 |
| WO | WO 2008028294 A1 | 3/2008 |
| WO | WO02059035 A2 | 4/2008 |
| WO | WO 2007011830 A2 | 4/2008 |
| WO | WO 2008065401 | 6/2008 |
| WO | WO 2008066757 A2 | 6/2008 |

OTHER PUBLICATIONS

Lancer, Redirect your store traffic from the cooler to your more profitable post-mix fountain area by adding fun and creating excitement; FS Series (Apr. 2003); pp. 4.
Supplemental Disclosure under 37 C.F.R. 1.56 dated Oct. 26, 2009, filed for U.S. Appl. No. 11/276,553.
International Search Report and Written Opinion (PCT/US2007/063031), International Searching Authority, dated Dec. 12, 2007.
International Search Report and Written Opinion (PCT/US2007/063033), International Searching Authority, dated May 16, 2008.
International Search Report and Written Opinion (PCT/US2007/063035), International Searching Authority, dated Dec. 12, 2007.
International Search Report and Written Opinion (PCT/US2008/067217), International Searching Authority, dated Jan. 5, 2009.
International Search Report and Written Opinion (PCT/US2008/068294), International Searching Authority, dated May 18, 2009.
Fast & Fluid—The Tinting Company, "TintMasterHairCare (hair dye dispenser)," (http://www.fast-fluid.com/product/detailProduct.asp?ProductID=71&parentID=28) Dec. 18, 2005.
Fast & Fluid—The Tinting Company, "Dispensers," (http://www.fast-fluid.com/product/cosmeticsDispensersEng.asp?MenuItemID=12&parentID=28) Dec. 18, 2005.
Fast & Fluid—The Tinting Company, "Mixers & Shakers," (http://www.fst-fluid.com/product/cosmeticsShakersMixersEng.asp?MenuItemID=13&parentID=28) Dec. 18, 2005.
Fast & Fluid—The Tinting Company, "Prismapro," (http://www.fast-fluid.com/software/primaProEng.asp?ParentID=29) Dec. 18, 2005.
Ipifini, "Choice Enabled Packaging," (www.ipifini.com/tech.html) 2006.
International Search Report & Written Opinion (PCT/US2007/062973), International Searching Authority, dated Dec. 21, 2007.
Disclosure Under 37 CFR § 1.56 dated Sep. 23, 2008, filed for U.S. Appl. No. 11/276,553.

\* cited by examiner

METHODS AND APPARATUSES FOR MAKING COMPOSITIONS COMPRISING AN ACID AND AN ACID DEGRADABLE COMPONENT AND/OR COMPOSITIONS COMPRISING A PLURALITY OF SELECTABLE COMPONENTS

TECHNICAL FIELD

This invention relates to making compositions comprising at least one first component and at least one second component which is degradable by the first component, and more particularly, to dispensing a variety of compositions comprising at least one first component and one or more of a plurality of second components which are degradable by the first component.

BACKGROUND OF THE INVENTION

Generally, some compositions which include an acid component and an acid-degradable component are desired to be fresh or to have characteristics of freshness when used by an end user. Examples of such compositions include some beverages that are packaged and stored for long periods of time before consumption or are made from beverage components that are stored for long periods of time before mixing to form the beverage which is then consumed by an end user. A particular example is a carbonated soft drink which typically includes an acid component and an acid-degradable component. More generally, other compositions may include a first component and a second component, wherein the second component is degradable by the first component. As used herein, the term "degradable" refers to the capability of the second component to react with the first component. For example, the second component may be capable of chemically reacting with the first component to form a chemically different composition.

In addition, there is a wide variety of compositions which can be mixed on demand for use by an end user. For example, in the contemporary beverage market, there is increasing demand for a large variety of beverage flavors and products. In addition to the traditional cola brands containing syrup and caffeine, there is a demand for artificially sweetened drinks, caffeine-free drinks, calorie-free drinks, low-calorie drinks, low-carbohydrate drinks, and multi-flavored drinks such as lime or vanilla flavored colas. The beverage industry has responded to this demand by providing a large variety of pre-mix, packaged products to satisfy the consumer's tastes.

In the post-mix or fountain beverage market conventional dispensers are bi-mix systems which mix sweetened flavor concentrate (also called "syrup") and a diluent, such as carbonated water, together to form a post-mix beverage. Generally speaking, these dispensers have one dispenser nozzle and an associated valve for each flavor of beverage to be dispensed. Consequently, the number of beverage choices for a given dispenser is limited by the number of nozzles available, especially since the use of the same nozzle for different flavors is likely to result in flavor carry-over from beverage to beverage.

U.S. Pat. No. 4,753,370, which is expressly incorporated herein by reference in its entirety, discloses a tri-mix beverage dispensing system which includes an unsweetened flavor concentrate assembly having multiple flavor concentrates, a sweetener syrup assembly, and a diluent assembly, such as for carbonated water. Each flavor concentrate comprises all the components of the beverage except for the sweetener syrup and the diluent. One of the flavor concentrates, the sweetener syrup, and the diluent are mixed together to form a post-mix beverage. Mixing occurs outboard of a nozzle structure. Consequently, a common nozzle may be utilized for mixing a wide variety of beverage flavors without flavor carry-over in the nozzle. However, each beverage selection must have a separate, respective flavor concentrate. Thus, the number of beverages which may be dispensed is equivalent to and dependant upon the number of flavor concentrates.

Accordingly, there is a need for a method and apparatus for making and dispensing a greater variety of compositions and beverages which are independent of the number of components available.

SUMMARY OF THE INVENTION

The present disclosure relates to methods for making a composition comprising storing at least one acid in an acid storage container, storing at least one acid-degradable component in a component storage container, and mixing the acid from the acid storage container and the acid-degradable component from the component storage container. The acid and the acid-degradable component mix together to form the composition, which comprises the acid and the acid-degradable component.

More particularly, this disclosure also encompasses methods for providing a selected beverage from a plurality of selectable beverages comprising storing a number of non-sweetener beverage component concentrates separately in a respective number of beverage component storage containers, the number of non-sweetener beverage component concentrates being two or more, receiving a request for the selected beverage, and in response the selection of the selected beverage, automatically dispensing, continuously in a predetermined ratio for any volume of the beverage dispensed, any combination of at least two or more of the number of non-sweetener beverage component concentrates from the respective beverage component storage containers and a diluent into a container such that the combination of the non-sweetener beverage component concentrates and the diluent mix together and form the selected beverage comprising the combination of the non-sweetener beverage component concentrates and the diluent.

In addition, this disclosure encompasses an apparatus for selectively preparing a selected beverage from a plurality of selectable beverages comprising, a first acid storage container for storing a first acid, a plurality of beverage component storage containers for storing a plurality of respective acid-degradable beverage components, a user interface for selecting the selected beverage from the plurality of selectable beverages, and a dispenser for automatically dispensing into a container, in response to a user selecting the selected beverage through the user interface, the first acid from the first acid storage container and one or more of the plurality of acid-degradable beverage components from respective ones of the plurality of beverage component storage containers such that the first acid and the one or more acid-degradable beverage components mix together to form the selected beverage comprising the first acid and the one or more acid-degradable beverage components.

Furthermore, this disclosure encompasses an apparatus for selectively preparing a selected beverage from a plurality of selectable beverages comprising, a number of beverage component storage containers for separately storing a number of non-sweetener beverage component concentrates, the number of non-sweetener beverage component concentrates being two or more, a user interface for selecting the selected beverage from the plurality of selectable beverages, and a dispenser for automatically dispensing, continuously in a predetermined ratio for any volume of the beverage dispensed, into a container, in response to the user selecting the selected beverage through the user interface, any combination of at least two or more of the number of non-sweetener beverage component concentrates from respective ones of the beverage component storage containers and a diluent such that the combination of the non-sweetener beverage component concentrates and the diluent mix together and form the selected beverage comprising the combination of the number of non-sweetener beverage component concentrates and the diluent.

Other objects, features, and advantages of this invention will be apparent from the following detailed description, drawing, and claims.

DETAILED DESCRIPTION OF EMBODIMENTS

Figure 1:
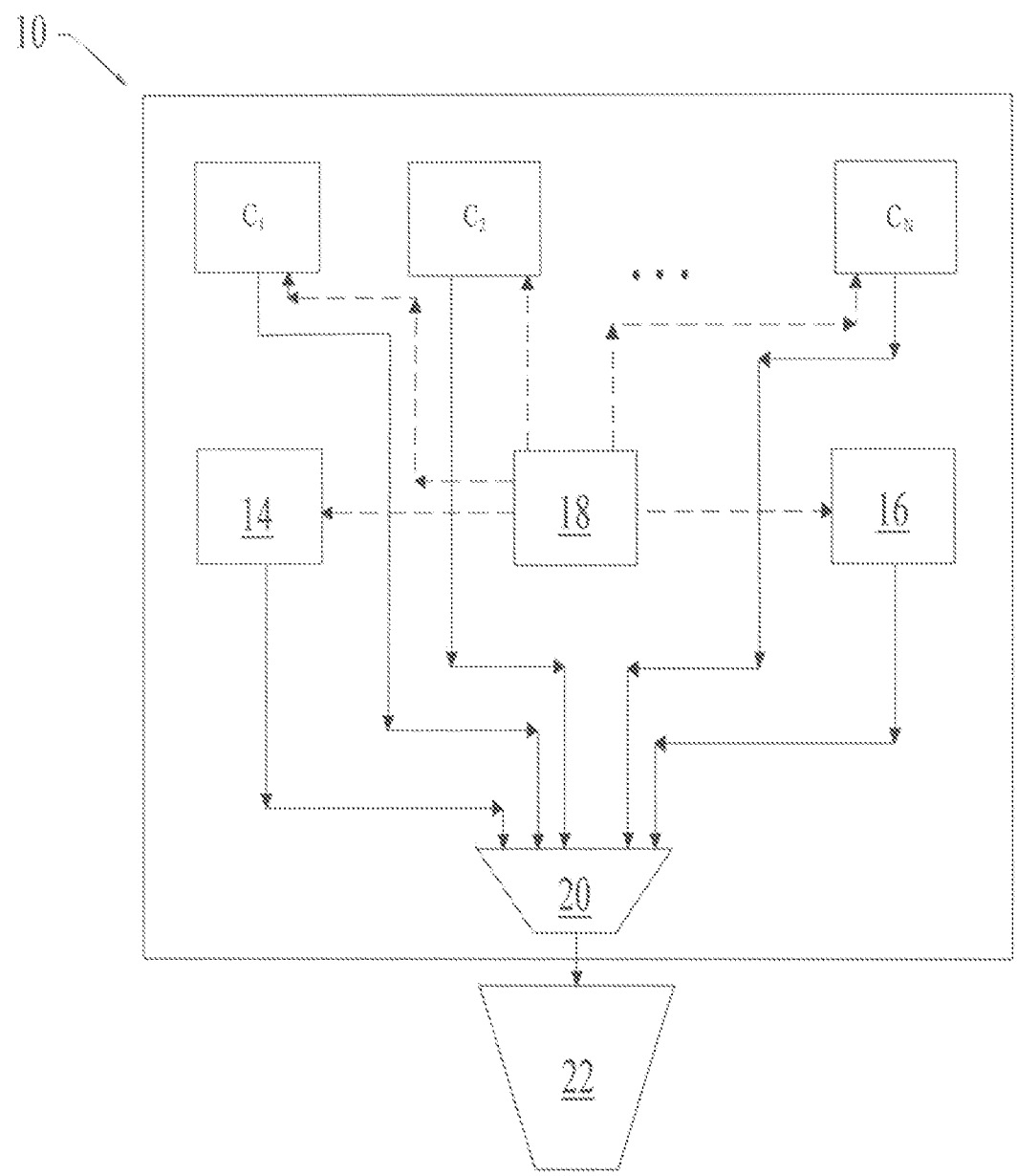
FIG. 1 is a schematic illustration of an apparatus for making and dispensing a variety of beverages made in accordance with an embodiment of the present invention.

As summarized above, this disclosure encompasses a method for making a composition, a method for providing a selected beverage from a plurality of selectable beverages, and apparatuses for selectively preparing a beverage selected from a plurality of selectable beverages. The methods and apparatuses provided by embodiments of the present invention provide fresh compositions, such as beverages, to end users and also provide methods and apparatuses for dispensing a variety of beverages to consumers. Embodiments are described in detail below and are illustrated in FIG. 1.

This invention can be used to make a variety of compositions including but not limited to beverages, motor oils, gasoline, cleaning solutions or mixtures, cosmetics, pigments, or inks. Generally, any composition comprising an acid and an acid-degradable component may be made by particular embodiments of this invention. In addition, embodiments of this invention can be used to make compositions comprising solids, liquids, gases, gels, colloids, solid/fluid mixtures or suspensions, and liquid/gas mixtures or solutions, for example.

Particular embodiments of the method of making a composition comprise storing at least one acid in an acid storage container, storing at least one acid-degradable component in a component storage container, and mixing the acid and the acid-degradable component together to form the composition. As used herein, the term "acid-degradable component" means that the component is capable of reacting with at least one acid. Without limitation, the acid and the acid-degradable component may chemically react (e.g. oxidize or reduce) or have intermolecular interactions (e.g., form a hydrogen bond, faun an ionic bond, have dipole-dipole interactions).

For example, with regard to a beverage composition, an acid-degradable component may chemically react with an acid and cause a change in the taste of the beverage composition when both are mixed to form the beverage composition.

Since the acid and acid-degradable component are stored separately from each other prior to forming the composition, the acid cannot degrade the acid-degradable component during storage and thus, the composition is made with an enhanced freshness and is suitable for use by an end user while the composition is still fresh. As used herein, the term "fresh" means that little time has passed since creation of the composition. For example, with regard to a beverage composition, fresh means within moments after creation of the beverage, or in other words, after mixing of the acid and acid-degradable component. For example, the mixing of the acid and acid-degradable component can be proximate in time to consumption by the end consumer. In particular embodiments, an acid may be mixed with an acid-degradable component at a point of creation within or proximate to a container into which the composition is being dispensed.

In other embodiments, the method of making a composition may comprise storing other components separately and then mixing the separately stored components to form the composition. For example, the method of making a composition could comprise storing at least one base in a base storage container, storing at least one base-degradable component in a component storage container, and mixing the at least one base from the base storage container and the at least one base-degradable component from the component storage container such that the at least one base and the at least one base-degradable component mix together to form the composition comprising the at least one base and the at least one base-degradable component. In consequence, this invention can be used to make any composition comprising a base and a base-degradable component.

In various other embodiments, the separately stored components may comprise a free-radical component and a free-radical-degradable component, a heated component and a heat-degradable component, a light-emitting component and a light-degradable component, or a radiation emitting component and a radiation-degradable component, for example. More generally, examples of suitable components to be stored separately and then mixed to form a composition for embodiments of this invention include any degrading components and any components degradable by any of the degrading components. As used herein, the term "degradable" refers to the capability of the degrading component to react with the degradable component. For example, a degradable component may have chemical reaction or an intermolecular interaction with a degrading component in a motor oil composition to change the viscosity of the motor oil composition formed.

In particular embodiments, the composition may comprise beverages which include, but are not limited to, one or more food acids and one or more food acid-degradable beverage components. At least one food acid is stored in an acid storage container and likewise, at least one food acid-degradable beverage component is stored in a component storage container. Examples of food acids suitable for embodiments of the present invention include, but are not limited to, phosphoric acid, lactic acid, citric acid, fumaric acid, tartaric acid, malic acid, ascorbic acid or combinations thereof. Examples of food acid-degradable beverage components suitable for embodiments of the present invention include, but are not limited to, flavor oils, flavor chemicals, natural flavor extracts, caramel, preservatives, caffeine, caloric sweeteners (e.g. natural and artificial), non-caloric sweeteners (e.g. natural and artificial), vitamins, and combinations thereof. Examples of beverages which may be a made by this method include, but are not limited to, carbonated and non-carbonated soft drinks, coffee, tea, fruit and vegetable juice, beverages, juice drinks, isotonic beverages and nonisotonic beverages, and flavored water drinks.

In such embodiments, the separate storage of a food acid and a food-acid degradable beverage component before mixing the food acid and the food acid-degradable beverage component to form a beverage allows the beverage to be delivered to an end consumer without degradation of the food acid-degradable beverage component during storage. Examples of beverage properties which may be enhanced include, but are not limited to, sweetness, lack of "off-flavors," quality, robustness of taste or flavor, aroma, savoriness, and feel.

In alternate embodiments, a juice drink with enhanced freshness can be made by mixing a food acid and a food acid-degradable beverage component to form the juice drink proximate to dispensing the juice drink into a drinking glass or carton package for later use by an end consumer. In this way, "off-flavors" can be reduced or eliminated because the food acid and the food acid-degradable beverage components have less time to react and break down the desirable properties of the juice drink before consumption of the juice drink by the end consumer.

This method of making a composition may be used in manufacturing applications such as bottling plant applications, post-mix applications, in-store applications, and vending applications. For instance, in bottling plant beverage applications, a beverage may be formed from one or more food acids one or more food acid-degradable beverage components by dispensing the food acid and food acid-degradable beverage component from their separate storage containers into a bottle, a can, a box, a bag, or other package for use by an end consumer. In another embodiment, a post-mix beverage can be formed from one or more food acids and one or more food acid-degradable beverage components by dispensing the food acid and food acid-degradable beverage components within or proximate to a cup or a drinking glass, for example.

In particular embodiments, the acid may comprise an acid concentrate. For example, the acid may comprise a food acid concentrate. Similarly, the acid-degradable component may comprise an acid-degradable component concentrate in particular embodiments. For example, the acid-degradable component may comprise a food acid-degradable beverage component concentrate.

In particular embodiments, the mixing of the acid concentrate with the acid-degradable component can be carried out such that the at least one acid concentrate is present in the composition in a ratio based on parts by volume of the composition to parts by volume of the at least one acid concentrate ranging from about 1,000,000:1 to about 5:1. More particularly, the at least one acid concentrate is present in the composition in a ratio based on parts by volume of the composition to parts by volume of the at least one acid concentrate ranging from about 2,000:1 to about 75:1. Still more particularly, the at least one acid concentrate is present in the composition in a ratio based on parts by volume of the composition to parts by volume of the at least one acid concentrate ranging from about 300:1 to about 75:1. Additionally, the mixing of the acid concentrate with the acid-degradable component concentrate can be carried out such that the at least one acid-degradable component concentrate is present in the composition in a ratio based on parts by volume of the composition to parts by volume of the at least one acid-degradable component concentrate ranging from about 1,000,000:1 to about 5:1. More particularly, the at least one acid-degradable component concentrate is present in the composition in a ratio based on parts by volume of the composition to parts by volume of the at least one acid-degradable component concentrate ranging from about 2,000:1 to about 75:1. Still more particularly, the at least one acid-degradable component concentrate is present in the composition in a ratio based on parts by volume of the composition to parts by volume of the at least one acid-degradable component concentrate ranging from about 300:1 to about 75:1.

However, it should be understood that, in other embodiments, the mixing of the acid concentrate with the acid-degradable component concentrate can be carried out such that the at least one acid concentrate is present in the composition in broader ratios than 5:1. Likewise, it should be understood that the mixing of the acid concentrate with the acid-degradable component concentrate can be carried out such that the at least one acid-degradable component concentrate is present in the composition in broader ratios than 5:1.

The ability to create compositions using composition-to-acid ratios and composition-to-acid-degradable component ratios up to 1,000,000:1 allows for the use of smaller volumes of acid and acid-degradable component than would be required if lower ratios were used to make the same volume of composition. The smaller volumes of acid and acid-degradable components required results in lower costs for storage and shipment, for example. Furthermore, in particular embodiments, the composition-to-acid ratio and composition-to-acid-degradable component ratio could be matched so that a their respective storage containers, if equal in volume, could be emptied at the same time, or at predetermined intervals.

In other embodiments, the composition may be selectable from a plurality of selectable compositions and the method can further comprise storing a plurality of acid-degradable components in a respective plurality of component storage containers, receiving a request for the composition, and in response to the selection of the composition, automatically dispensing at least one acid and one or more of the acid-degradable components such that the acid and the one or more acid-degradable components mix together to form the composition. In still other embodiments, the composition may be selectable from a plurality of selectable compositions and the method can further comprise storing a plurality of acids in a plurality of respective acid containers, storing a plurality of acid-degradable components in a respective plurality of component storage containers, receiving a request for the composition, and in response to the selection of the composition, automatically dispensing one or more of the acids and one or more of the acid-degradable components such that the one or more acids and the one or more of the acid-degradable components mix together to form the composition.

As a consequence of storing the acids and the acid-degradable components separately a number of different compositions can be produced. In one example, a first acid (A1) may be stored in a first acid storage container, a second acid (A2) may be stored in a second acid container, a first acid-degradable component (ADC1) may be stored in a first component storage container, and a second acid-degradable component (ADC2) may be stored in a second component storage container. In such an example, at least five compositions comprising the first acid are possible (e.g., A1+ADC1, A1+A2+ADC1, A1+A2+ADC1+ADC2, A1+A2+ADC2, A1+ADC2). As a result of this processing flexibility, the number of different compositions which can be forming by this method exceeds the number of acids and acid-degradable components stored.

Consequently, a method for providing a selected composition from a plurality of selectable compositions is also provided by this disclosure. This method comprises storing at least one acid in an acid storage container, storing at least one acid-degradable component in a component storage container, receiving a request for the selected composition, and in response to the selection of the selected composition, automatically dispensing, continuously in a predetermined ratio for any volume of the composition dispensed, at least one acid from the acid storage container and at least one acid-degradable component from the component storage container such that the acid and the acid-degradable component mix together and form the selected composition comprising the acid and the acid-degradable component. In alternate embodiments, any components suitable to be stored separately and then mixed to form a selected composition such as any degrading components and any components degradable by any of the degrading components can be use in providing the selected composition.

This method for providing a selected composition from a plurality of selectable composition may be used in embodiments for providing compositions such as, but not limited to, motor oil, gasoline, cleaning solutions or mixtures, cosmetics, pigments, or ink. For example, in motor oil dispensing applications, such as in a mechanics shop, it may be desirable to have different grades or types (e.g., ordinary or synthetic) of motor oils provided. In such an instance, a plurality of selectable motor oils may be provided by storing an acid in an acid container, storing an acid-degradable component in a component storage container, and upon receipt of and in response to a selection of a particular type of motor oil, automatically dispensing, continuously in a predetermined ratio for any volume of the motor oil desired, the acid and the acid-degradable component such that the acid and acid-degradable component mix together and form the selected motor oil. In general, the method of the present disclosure is suitable for providing any selection of a composition selectable from a plurality of compositions which may be formed from separately stored components by automatic and continuous dispensing in response to the receipt of the selection.

In embodiments where the composition is a beverage, a number of different beverages can also be produced and this disclosure also encompasses a method for providing a selected beverage from a plurality of selectable beverages. In particular embodiments, the method for providing a selected beverage from a plurality of selectable beverages comprises storing a number of non-sweetener beverage component concentrates separately in a respective number of beverage component storage containers, the number of non-sweetener beverage component concentrates being two or more, receiving a request for the selected beverage from a plurality of different selectable beverages, and in response to the selection of the selected beverage, automatically dispensing any combination of at least two or more of the non-sweetener beverage component concentrates and a diluent into a container. The non-sweetener beverage component concentrates and the diluent mix together to form the selected beverage. In addition, the non-sweetener beverage component concentrates and the diluent are continuously dispensed in a predetermined ratio for any volume of the beverage dispensed. In particular embodiments, the number of non-sweetener beverage component concentrates is three or more, four or more, five or more, or still even more.

In other particular embodiments, the non-sweetener beverage component concentrates can include, but are not limited to, food acid concentrates and concentrates of flavor oils, flavor chemicals, natural flavor extracts, caramel, preservatives, caffeine, vitamins, other functional additives or any other suitable additives and combinations thereof. Suitable diluents include, but are not limited to, syrup, a caloric sweeteners, a non-caloric sweeteners, water, carbonated water, and combinations thereof.

As a consequence of storing the non-sweetener beverage component concentrates separately, any combination of these components can be produced and the number of selectable beverages can exceed the number of stored non-sweetener beverage components. For example, a first beverage component storage container may contain a cola flavor, a second beverage component storage container may contain a cherry flavor, and a third beverage component storage container may contain a vanilla flavor. In such an embodiment, the variety of selectable beverages may include, but is not limited to, cola, cherry flavored cola, cherry and vanilla flavored cola, and vanilla flavored cola. The variety of selectable beverages is further increased when the diluent source comprises several diluents, such as caloric sweeteners and non-caloric sweeteners as well as carbonated water. In such embodiments the different selectable beverages could be dispensed as a "regular," a "midcal," or a "diet" version of the cola, the cherry flavored cola, the cherry and vanilla flavored cola, and the vanilla flavored cola, for example.

This method for providing a selected beverage may be used in manufacturing applications such as bottling plant applications, post-mix applications, in-store applications, and vending applications. In particular embodiments, the non-sweetener beverage component concentrate can be mixed to form the beverage such that the non-sweetener beverage component concentrate is present in the beverage in a ratio based on parts by volume of the beverage to parts by volume of the non-sweetener beverage component concentrate ranging from 1,000,000:1 to 5:1. More particularly, the non-sweetener beverage component concentrate is present in the beverage in a ratio based on parts by volume of the beverage to parts by volume of the non-sweetener beverage component concentrate ranging from 2,000:1 to 75:1. Still more particularly, the non-sweetener beverage component concentrate is present in the beverage in a ratio based on parts by volume of the beverage to parts by volume of the non-sweetener beverage component concentrate ranging from 300:1 to 75:1.

In other embodiments, an apparatus for selectively preparing a selected beverage from a plurality of selectable beverages is also provided. FIG. 1 illustrates an apparatus 10 made in accordance with an embodiment of the present invention for use in carrying out embodiments of methods of the present invention. Although the invention is described in terms of an apparatus 10 which is a beverage dispenser, the invention is applicable to the combination of any type of ingredient, wet or dry. Examples of suitable dispensers 10 for embodiments of this invention include, but are not limited to, post-mix dispenser, a vending machine dispenser, an in-store dispenser, or a bottling plant beverage dispenser. The apparatus 10 comprises a plurality of beverage component storage containers $C_1, C_2, \ldots, C_N$, a first diluent source 14, and a second diluent source 16. In addition, the apparatus 10 comprises a user interface 18 and a dispenser nozzle 20.

The beverage component storage containers $C_1, C_2, \ldots, C_N$ may each comprise a bag, a tank, a box, or any container suitable for storing non-sweetener beverage component concentrates. Preferably, the beverage component storage containers $C_1, C_2, \ldots, C_N$ may be positioned within the beverage dispenser 10 itself as opposed to being remotely positioned in conventional bag in box containers or otherwise. Any other type of storage arrangements may also be used.

The first diluent source 14 and the second diluent source 16 can each comprise a supply of beverage sweetener including, but not limited to, caloric sweeteners, non-caloric sweeteners, or syrup, water, carbonated water, a supply of any type of beverage diluent, or combinations thereof. In this embodiment, the first diluent source 14 comprises a beverage sweetener source and the second diluent source 16 comprises carbonated water source. It should be understood in other embodiments the apparatus 10 may comprise one diluent source or alternatively, more than two diluent sources.

According to particular embodiments of the invention, the first beverage component storage container $C_1$ can be a acid storage container which stores a first acid. In addition, a plurality of the remainder of the beverage component storage containers $C_2, \ldots, C_N$ can store a plurality of acid-degradable beverage components. Once a beverage is selected from a plurality of selectable beverages through the user interface 18, the acid and one or more of the acid-degradable beverage components are dispensed automatically in response to the selection to form the selected beverage. In some embodiments, the diluent sources 14, 16 are optional or may not be present at all. Furthermore, in particular embodiments, the first acid may comprise a first food acid and the plurality of acid-degradable beverage components may comprise food acid-degradable beverage components.

In other embodiments, the beverage storage containers $C_1, C_2, \ldots, C_N$ may comprise a plurality of acid storage containers storing a plurality of acids and a plurality of beverage component storage containers storing a plurality of acid-degradable beverage components. Once a beverage is selected from a plurality of selectable beverages through the user interface 18, one or more of the acids and one or more of the acid-degradable beverage components are dispensed automatically in response the selection to form the selected beverage. Again, in some embodiments, the diluent sources 14, 16 are optional or may not be present at all. Furthermore, in particular embodiments, the plurality of acids may comprise a plurality of food acids and the plurality of acid-degradable beverage components may comprise food acid-degradable beverage components.

In addition to providing a plurality of selectable beverages, the apparatus 10 allows for the separate storage of the acids and acid-degradable beverage components, and consequently allows the beverage to be provided to the end consumer while the beverage is fresh and without substantial degradation of the acid-degradable beverage components by the acids.

According to other embodiments of the invention, the beverage component storage containers $C_1, C_2, \ldots, C_N$ may be used to store two or more non-sweetener beverage component concentrates. Once a beverage is selected from a plurality of selectable beverages through the user interface 18, any combination of the two or more non-sweetener beverage component concentrates, a sweetener, and a diluent are dispensed automatically in response the selection to form the selected beverage. In alternate embodiments, a sweetener may be supplied by the diluent source 16 and thus, the apparatus 10 might not comprise a sweetener source 14. In still other embodiments, the number of non-sweetener beverage components is three or more or four or more, or five or more, and so on. Again, embodiments of this invention can be used to make a variety of compositions including but not limited to beverages, motor oils, gasoline, cleaning solutions or mixtures, cosmetics, pigments, or inks.

In particular embodiments, the dispenser 10 dispenses the non-sweetener beverage component concentrates, the sweetener, and the diluent continuously in a predetermined ratio for any volume of the beverage dispensed. Thus, the same volume ratios of each component remain constant for any amount of beverage dispensed. For instance, the apparatus 10 could further comprise pumps to pump the non-sweetener beverage concentrates, the sweetener, and the diluent at set volumetric rates for each beverage selected. Thus, the beverage component storage containers $C_1, C_2, \ldots, C_N$, the first diluent source 14, and the second diluent source 16 each may be each be in communication with a pump or a metering device (not shown). A control device (not shown) may control the pumps and metering devices.

The pumps may be a conventional solenoid pump, positive displacement pump, or a similar type of device. Positive displacement pumps provide portion control for the more highly concentrated components which may be stored in the beverage component storage containers $C_1, C_2, \ldots, C_N$. An example of the operation of a positive displacement pump is shown in commonly owned U.S. patent application Ser. No. 11/276,548, filed in the U.S. Patent Office herewith and entitled "Pump System with Calibration Curve", which is incorporated herein by reference in its entirety. In addition, the pumps and the metering devices may be in fluid communication with the dispensing nozzle 20.

The dispensing nozzle 20 preferably may be a multi-flavor dispensing valve capable of mixing a number of fluids at the same time. Examples of dispensing nozzles 20 that may be used herein are shown in commonly owned U.S. patent application Ser. No. 10/233,867 (U.S. Patent Publication No. US 2004/0040983 A1) entitled "Dispensing Nozzle" and commonly-owned U.S. patent application Ser. No. 11/276,551, filed in the U.S. Patent Office herewith and entitled "Dispensing Nozzle Assembly", both of which are incorporated herein by reference in their entirety.

In particular embodiments where the dispensing nozzle 20 is a multi-flavor dispensing valve, the dispensing valve 20 may include a flow director in fluid communication with some or all of the beverage component storage containers $C_1, C_2, \ldots, C_N$, the first diluent source 14, and the second diluent source 16. The dispensing valve may further include a tertiary flow assembly having multiple conduits in fluid communication with some of the beverage component storage containers $C_1, C_2, \ldots, C_N$. This tertiary flow assembly may be placed adjacent to the flow director such that the flow of fluid from the flow director and the flow of fluid from the conduits is configured to intersect or be adjacent to one another. As a result of such placement, the beverage components and diluents can be mixed to form the selected beverage. The multiple conduits may have differing sizes and configurations depending upon the nature of the intended flow therethough. Examples of dispensers and dispensing nozzles suitable for use in embodiments of the present invention can be found in commonly owned U.S. patent application Ser. No. 11/276,550, filed in the U.S. Patent Office herewith and entitled "Beverage Dispensing System," and U.S. patent application Ser. No. 11/276,549, filed in the U.S. Patent Office herewith and entitled "Juice Dispenser", which are is incorporated herein by reference in their entirety.

The user interface 18 may include, but is not limited to, a user input means such as a key pad or touch pad, a processor, a memory device, and a controller. The user interface 18 is programmed such that the user can select from a plurality of beverages or beverage components via the user input means and the user interface then manipulates other components of the apparatus 10, in accordance with recipes or other beverage parameters stored in the interface, to continuously deliver the appropriate beverage components in accordance with the user's selection in a predetermined ratio for any volume of the beverage dispensed. Thus, the user can alter the ingredients of the beverage. In some embodiments, the user can also alter the intensity of the beverage or additives to taste. As such, the consumer can submit an entire "recipe" for a beverage. The apparatus 10 thus provides the consumer with the ability to create and blend numerous types of beverages as desired by altering the ingredients the beverage to taste.

The user interface 18, with a controller, then instructs individual pumps and/or the metering devices to dispense the appropriate ingredients in the appropriate proportions to the dispenser nozzle 20 for a given flow rate. For example, for a selected beverage, a first beverage component from the first beverage storage container $C_1$ and a diluent may be pumped to the flow director of a multi-flavor dispensing valve while a second beverage component and a third beverage component are pumped from a second beverage storage container $C_2$ and a third beverage storage container $C_3$, respectively, to individual conduits in the tertiary flow assembly of the multi-flavor dispensing assembly, where the three beverage components and diluent are mixed to form the selected beverage. In embodiments where the intensity of the beverage component may be varied by the user, the conduits may be larger or smaller to vary the flow rate of the beverage component having a selectable intensity.

The pumps and the metering devices may be pulsed on and off as desired to vary the flow rate. Such pulsing, for example, may ensure mixing of the ingredients. The beverage may be mixed at the dispensing nozzle 20 or anywhere downstream of the beverage component storage containers $C_1, C_2, \ldots, C_N$, the first diluent source 14, and the second diluent source 16 (e.g., back room, in-line, etc.). Different flow rates and flow timing may be employed, e.g., certain fluid streams may be added early or late, certain fluid streams may be pulsed, etc. The process by which the selected beverage is selected and dispensed is discussed in further detail below in reference to FIGS. 2 and 3.

In other embodiments, the user interface 18 may also include, but is not limited to, a wireless signal receiver for receiving a request for a selected beverage and/or a wireless signal transmitter so that the user can communicate with the user interface wirelessly. In addition, particular embodiments of the user interface 18 may include a prepaid card reader, a credit card reader, a debit card reader, or a smart card reader to allow the user to purchase a beverage using various methods besides cash. Also, some embodiments of the user interface 18 may include a parental control device to allow someone besides the user (i.e., the child) to select the beverage to be dispensed or prevent the selection of some of the selectable beverages.

Figure 2:
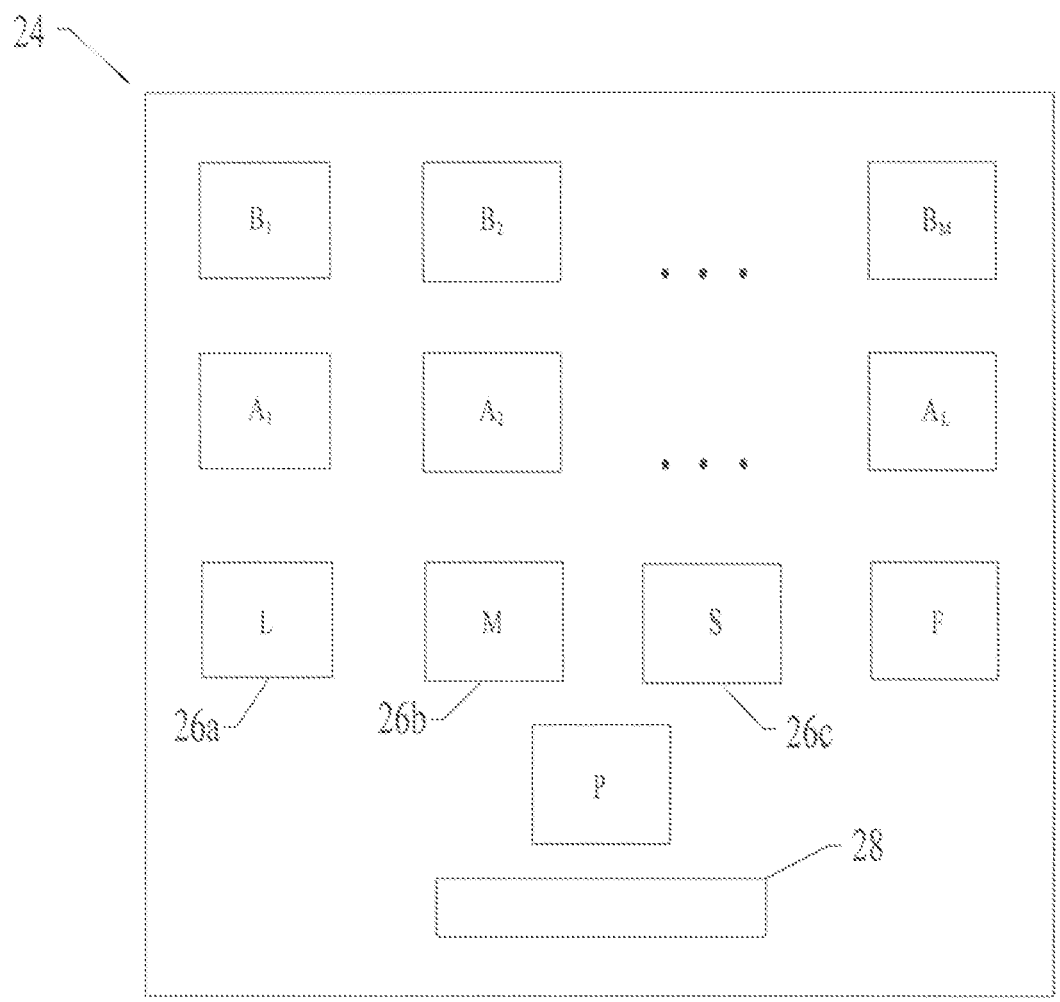
FIG. 2 is a schematic illustration of an user input means for selecting a selectable beverage from a variety of product or product component choices and additive choices made in accordance with an embodiment of the present invention.

FIG. 2 illustrates one embodiment of a user input means 24 for selecting a selectable beverage from a variety of product or product component choices and additive choices. The user input means 24 comprises a key pad have multiple buttons which can be selected by a user. The first row of buttons comprise the product buttons $B_1, B_2, \ldots, B_M$. The second row of buttons comprise additive buttons $A_1, A_2, \ldots, A_L$. The third row of buttons comprise beverage size buttons 26 and a continuous flow button F. Additionally, a pour button P is provided. It should be understood that alternate embodiments may include less buttons, omitted types of buttons, more buttons, and buttons for different functions, such as buttons for canceling a selection or for displaying nutritional information, for example. The user input means also includes a display means 28, such as an light emitting diode (LED) display, a graphical interface, or a communication device to display information such as dispenser statistics or troubleshooting information to the user.

Each product button $B_1, B_2, \ldots, B_M$ may be associated with a different base product or product component. Each base product or product component may comprise one or more of the non-sweetener beverage concentrates, one or more of the acids, one or more of the acid-degradable beverage components, or combinations thereof which are stored in the beverage component storage containers $C_1, C_2, \ldots, C_N$. For example, the first product button $B_1$ could be labeled cola and be associated to a first non-sweetener beverage component concentrate stored in the first beverage component storage container $C_1$ and a second non-sweetener beverage component concentrate stored in the second beverage component storage container $C_2$, which, when both are mixed together and with a diluent, form a cola beverage. Each of the other product buttons $B_2 \ldots, B_M$ may also be associated with ingredients stored in the first beverage component storage container $C_1$ or the second beverage component storage container $C_2$ or other beverage component storage containers $C_3 \ldots, C_N$. Other examples of labels for the product buttons $B_1, B_2, \ldots, B_M$ include, but are not limited to, lemon-lime cola, diet cola, and juice.

Each additive button $A_1, A_2, \ldots, A_L$ also may be associated with one or more of the non-sweetener beverage concentrates, one or more of the acids, one or more of the acid-degradable beverage components, or combinations thereof which are stored in the beverage component storage containers $C_1, C_2, \ldots, C_N$. For example, the first additive button $A_1$ could be labeled "Vanilla" and may be associated with a first non-sweetener beverage component concentrate comprising a vanilla flavor beverage component concentrate stored in the first beverage component storage container $C_1$. Each of the other additive buttons $A_2 \ldots, A_L$ may also be associated with ingredients stored in other beverage component storage containers $C_2 \ldots, C_N$. Other examples of labels for the additive buttons $A_1, A_2, \ldots, A_L$ include, but are not limited to, "Lime", "Cherry", and "Black Cherry".

The beverage size buttons 26 are each associated with a predetermined volume of beverage which can be dispensed from the apparatus 10. For example, the beverage size button L is associated the dispensing of a "large" size beverage, while the beverage size button M is associated with the dispensing of a "medium" size beverage and the beverage size button S is associated with the dispensing of a "small" size beverage. The actual and relative volumes of beverage dispensed may be adjusted or set by the manufacturer of the apparatus or the owner of the apparatus, for example.

The flow button F is associated with a continuous pour mode of the apparatus 10. In other words, as opposed to a conventional batch operation where a predetermined amount of ingredients are combined, the apparatus 10 provides for continuous mixing and flows in the correct ratio for a pour of any volume. This continuous mix and flow method can also be applied to the dispensing of a particular size beverage selected by the selection of a beverage size button by setting a predetermined dispensing time for each size of beverage. This ability to dispense the appropriate ingredients in the appropriate proportions for a given flow rate results from the use of individual pumps and/or metering devices for each of the non-sweetener beverage component concentrates and the diluents.

Once the desired product or product component, additives, and beverage size or flow mode have been selected, the user can select the pour button P, which activates the dispensing of the selected beverage from the dispensing nozzle 20.

It should be understood that other embodiments of the user input means 24 may be suitable for use in the present invention. Examples of suitable user input means 24 for embodiments of this invention include a user input means comprising a touch-screen monitor or a computer, for example. Furthermore, the user input means 24 may also include, but is not limited to, selectable selections based on programmed user preferences, programmed preselected beverages, programmed preselected quantities, or programmed selections based on the time of day and/or physical location.

Figure 3:
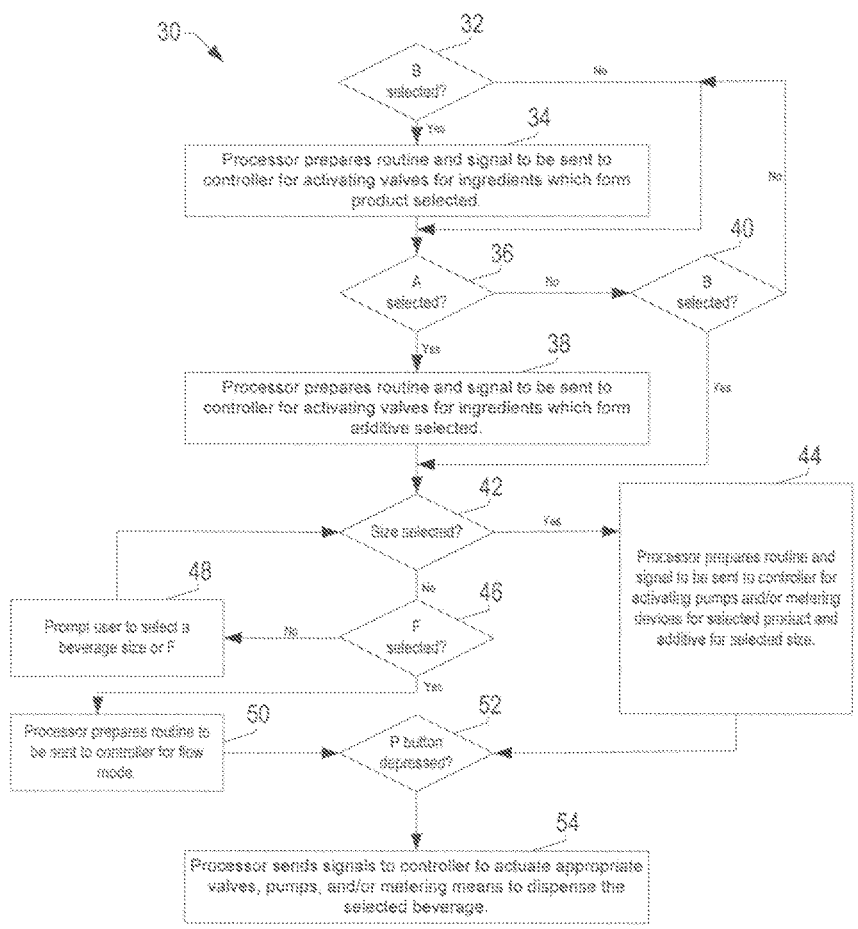
FIG. 3 is a flowchart illustrating one embodiment of a method for making and dispensing a variety of beverages which are selectable by an user.

Further detail regarding operation of the apparatus 10 and user input means 24 is described below and in the flowchart in FIG. 3, which illustrates one embodiment of a method for making and dispensing a variety of beverages which are selectable by a user. The flowchart 30 begins at step 32 when the processor determines whether a product button. B has been selected by a user. If a product button B has been selected by the user, the method proceeds to step 34 and processor prepares the appropriate routine and signal to be sent to the controller for actuating the valves associated with the non-sweetener beverage component concentrates, acids, or acid-degradable beverage components which make up the desired product or product components before progressing to step 36. If a product button B has not been selected, then the method progresses immediately to step 36. In some embodiments (not shown) where multiple products or product components are selected which are not "compatible" with each other, the processor could indicate to the user that the products or product components selected are "not selectable together". For example, the processor could send a signal to display an error message in the display means 28 if two product buttons are selected which would result in the mixing of components which are "not compatible". The compatibility of products or product components may be set or recommended by the beverage manufacturer and could be predetermined, for example.

At step 36, the processor determines whether an additive button A has been selected by the user. If an additive button A has been selected, the method proceeds to step 38 and the processor prepares the appropriate routine and signal to be sent to the controller for actuating the valves associated with the non-sweetener beverage component concentrates, acids, or acid-degradable beverage components which make up desired additive before progressing to step 42. If an additive button has not been selected, then the method proceeds to step 40. At step 40, the method goes back to step 32 if neither a product button B or an additive button A has been selected. If a product button B was selected in step 32, then the process proceeds to step 42. In some embodiments (not shown), the additives selected may not be "compatible" with each other or with the products or product components are selected and the processor could indicate to the user that the products or product components selected are "not selectable together". The compatibility of the additives to each other and to products or product components may be set or recommended by the beverage manufacturer and could be predetermined, for example.

At step 42, the processor determines if a size button 26 has been selected. If a size button 26 has been selected, then the method proceeds to step 44, where the processor prepares the appropriate routine and signal to be sent to the controller for actuating the pumps and/or metering devices associated with the non-sweetener beverage component concentrates, acids, or acid-degradable beverage components associated with the selected product button B and additive button A. The actuation of the pumps and/or the metering devices associated with the non-sweetener beverage component concentrates, acids, or acid-degradable beverage components which are to be dispensed to form the selected beverage can be programmed into the processor so that the pumping or metering will occur at a predetermined flow rate for a predetermined dispensing time for the selected beverage and the selected beverage size. In addition, the dispensing of the non-sweetener beverage component concentrates, acids, or acid-degradable beverage components can be substantially simultaneous or in sequence. For example, the components comprising additives could be added when about eighty percent of the minimum drink size is poured so as to guarantee that there is no overdose effect if the drink is stopped prematurely. If a size button 26 has not been selected, then the process proceeds to step 46.

At step 46, the process determines if the flow button F has been selected. If the flow button F has been selected, then the process proceeds to step 50 and the processor prepares the appropriate routine and signal to be sent to the controller for actuating the pumps and/or metering devices associated with the non-sweetener beverage component concentrates, acids, or acid-degradable beverage components which make up the selected beverage in a continuous pour mode. In particular embodiments, the flow rates of can be programmed so that the appropriate pumps and/or metering devices are actuated substantially simultaneously at predetermined flow rates to produce the desired product at any volume when the pour button is depressed in step 52. If the flow button has not been selected, then the processor sends a signal to the display means 28 to prompt the user to select a beverage size or the flow mode in step 48.

At step 52, the processor determines whether the pour button P has been depressed. If the pour button P has been depressed, the method proceeds to step 54 and the processor sends the appropriate routines and signals which it had prepared for the selected beverage to the controller. The controller then actuates the appropriate valves, pumps, and/or metering devices to automatically dispense the desired beverage in the selected size or in a continuous pour.

An illustration of the use of the user input means 24 and the above-described method 30 can be demonstrated by an example where a user desires a large vanilla flavored cola. In this example, the apparatus comprises a first acid storage container storing a first food acid concentrate and a first beverage component storage container storing a first food acid-degradable beverage component concentrate. The first food acid concentrate and the first food acid-degradable beverage component concentrate form a cola base product beverage when mixed together. In a second beverage component storage container, a vanilla flavor concentrate is stored. The apparatus also comprises other beverage storage containers storing non-sweetener beverage component concentrates, acids and/or acid-degradable components which can be used to make other selectable beverages.

To begin the selection of the desired beverage, the user would select the product button labeled "cola". The processor would receive the selection signal for the cola product and then prepare the routine and signal to be sent to the controller for actuating the valves associated with the first acid storage container and the first beverage component storage container. Next, the user would select the additive button labeled "vanilla." The processor would receive the selection signal for the vanilla additive and then prepare the routine and signal to be sent to the controller for actuating the valves associated with the second beverage component storage container. Then, the user would select the "L" size button. The processor would receive the selection signal for a large beverage and then prepare the routine and signal to be sent to the controller for actuating the pumps and/or metering devices associated with the first acid storage container, the first beverage component storage container, and the second beverage storage container to produce a large vanilla cola. Subsequently, the user would depress the pour button and the routines and signals would be sent to the controller to pump and/or meter the first acid concentrate, the first acid-degradable beverage component concentrate, and the vanilla flavor concentrate at a predetermined flow rate for a predetermined dispensing time to provide the appropriate proportions of each to form a large vanilla cola.

In addition, the method could further comprise actuation of valves and pumps for one or diluent sources to provide a diluent. It should also be understood that the each of the processor steps preceding the selection of the pour button P, steps 34, 38, 44, and 50 could be combined with step 54. In other words, once the P button is depressed, the processor checks for the selection of all the buttons and then prepares and sends the appropriate routines and signals to the controller.

In other embodiments, the user may be allowed to adjust the intensity of the product or the additives with intensity selector buttons. Other details structure and programming of the interface 18 is well within the ordinary skill in the art and is not discussed further herein.

It should be understood that the foregoing relates to particular embodiments of the present invention, and that numerous changes may be made therein without departing from the scope of the invention as defined from the following claims.

We claim:

1. Method for making a selected post-mix beverage from a plurality of selectable post-mix beverages comprising,
   storing a plurality of food acid concentrates in a plurality of respective acid storage containers;
   storing a plurality of food acid-degradable concentrates in a respective plurality of component storage containers, wherein the food acid concentrates and the food acid-degradable concentrates are stored separately from each other;
   receiving a request for the selected post-mix beverage; and
   response to the selection of the post-mix beverage, automatically dispensing continuously in a predetermined ratio one of the plurality of the food acid concentrates from a respective one of the plurality of food acid storage containers and one of the plurality of food acid-degradable concentrates from a respective one of the plurality of component storage containers such that the one of the plurality of the food acid concentrates and the one of the plurality of food acid-degradable concentrates mix together to form the selected post-mix beverage.

2. Method as in claim 1 wherein the post-mix beverage is a carbonated beverage, a juice drink, a flavored water drink, a non-carbonated soft drink, coffee, tea, a vegetable beverage, an isotonic beverage, or a nonisotonic beverage.

3. Method as in claim 1 wherein the step of dispensing the selected post-mix beverage is conducted such that the one of the plurality of food acid concentrates and the one of the plurality of food acid-degradable concentrates mix together and form the selected post-mix beverage for consumption by an end consumer at a point proximate in time to consumption by the end consumer.

4. Method as in claim 1 further comprising dispensing the selected post-mix beverage into a container.

5. Method as in claim 1 wherein the one of the plurality of food acid concentrates and the one of the plurality of food acid-degradable concentrates mix together at a point of creation within or proximate to a container to form the selected beverage.

6. Method as in claim 1 wherein the step of dispensing the selected beverage further comprises dispensing the selected beverage from a post-mix dispenser, a vending machine, an in-store dispenser, or a manufacturing plant dispenser.

7. Method as in claim 1 wherein the one of the plurality of food acid concentrates comprise phosphoric acid, lactic acid, citric acid, fumaric acid, tartaric acid, malic acid, ascorbic acid or combinations thereof.

8. Method as in claim 1 wherein the one of the plurality of food acid-degradable concentrates comprises flavor oils, flavor chemicals, natural flavor extracts, caramel, preservatives, caffeine, caloric sweeteners, non-caloric sweeteners, or combinations thereof.

9. Method as in claim 1 wherein the one of the plurality of food acid concentrates is mixed to form the selected post-mix beverage such that the one of the plurality of food acid concentrates is present in the selected post-mix beverage in a ratio based on parts by volume of the selected post-mix beverage to parts by volume of the one of the plurality of food acid concentrates ranging from 1,000,000:1 to 5:1.

10. Method as in claim 1 wherein the one of the plurality of food acid concentrates is mixed to form the selected post-mix beverage such that the one of the plurality of food acid concentrates is present in the selected post-mix beverage in a ratio based on parts by volume of the selected post-mix beverage to parts by volume of the one of the plurality of food acid concentrates ranging from 2,000:1 to 75:1.

11. Method as in claim 1 wherein the one of the plurality of food acid concentrates is mixed to form the selected post-mix beverage such that the one of the plurality of food acid concentrates is present in the selected post-mix beverage in a ratio based on parts by volume of the selected post-mix beverage to parts by volume of the one of the plurality of food acid concentrates ranging from 300:1 to 75:1.

12. Method as in claim 1 wherein the one of the plurality of food acid-degradable concentrates is mixed to form the selected post-mix beverage such that the one of the plurality of food acid-degradable concentrates is present in the selected post-mix beverage in a ratio based on parts by volume of the selected post-mix beverage to parts by volume of the one of the plurality of food acid-degradable concentrates ranging from 1,000,000:1 to 5:1.

13. Method as in claim 1 wherein the one of the plurality of food acid-degradable concentrates is mixed to form the selected post-mix beverage such that the one of the plurality of food acid-degradable concentrates is present in the selected post-mix beverage in a ratio based on parts by volume of the selected post-mix beverage to parts by volume of one of the plurality of food acid-degradable concentrates ranging from 2,000:1 to 75:1.

14. Method as in claim 1 wherein the one of the plurality of food acid-degradable concentrates is mixed to form the selected post-mix beverage such that the one of the plurality of food acid-degradable concentrates is present in the selected post-mix beverage in a ratio based on parts by volume of the selected post-mix beverage to parts by volume of the one of the plurality of food acid-degradable concentrates ranging from 300:1 to 75:1.

15. Method as in claim 1 wherein the plurality of food acid concentrates cannot degrade the plurality of food acid-degradable concentrates during storage.

16. Method as in claim 1, wherein the step of automatically dispensing is performed by automatically dispensing the selected post-mix beverage continuously in a predetermined ratio for any volume of the composition dispensed.

17. Method as in claim 1, wherein the step of automatically dispensing further comprises dispensing a plurality of the food acid concentrates from the respective plurality of food acid storage containers to form the selected post-mix beverage.

18. Method as in claim 1, wherein the step of automatically dispensing further comprises dispensing a plurality of the food acid-degradable concentrates from the respective plurality of food acid-degradable storage containers to form the selected post-mix beverage.

19. Method as in claim 1, wherein the step of automatically dispensing further comprises automatically dispensing a diluent for the selected post-mix beverage continuously in a predetermined ratio.

20. Method as in claim 1, wherein the selected post-mix beverage comprises the dispensed food acid concentrate and dispensed food acid-degradable concentrate.

21. Method as in claim 1, wherein the number of selectable post-mix beverages exceeds the total number of food acid concentrates and food acid-degradable concentrates stored.

* * * * *